June 14, 1949.    G. J. SHARPS    2,473,348
FISH STRINGER
Filed Feb. 27, 1947
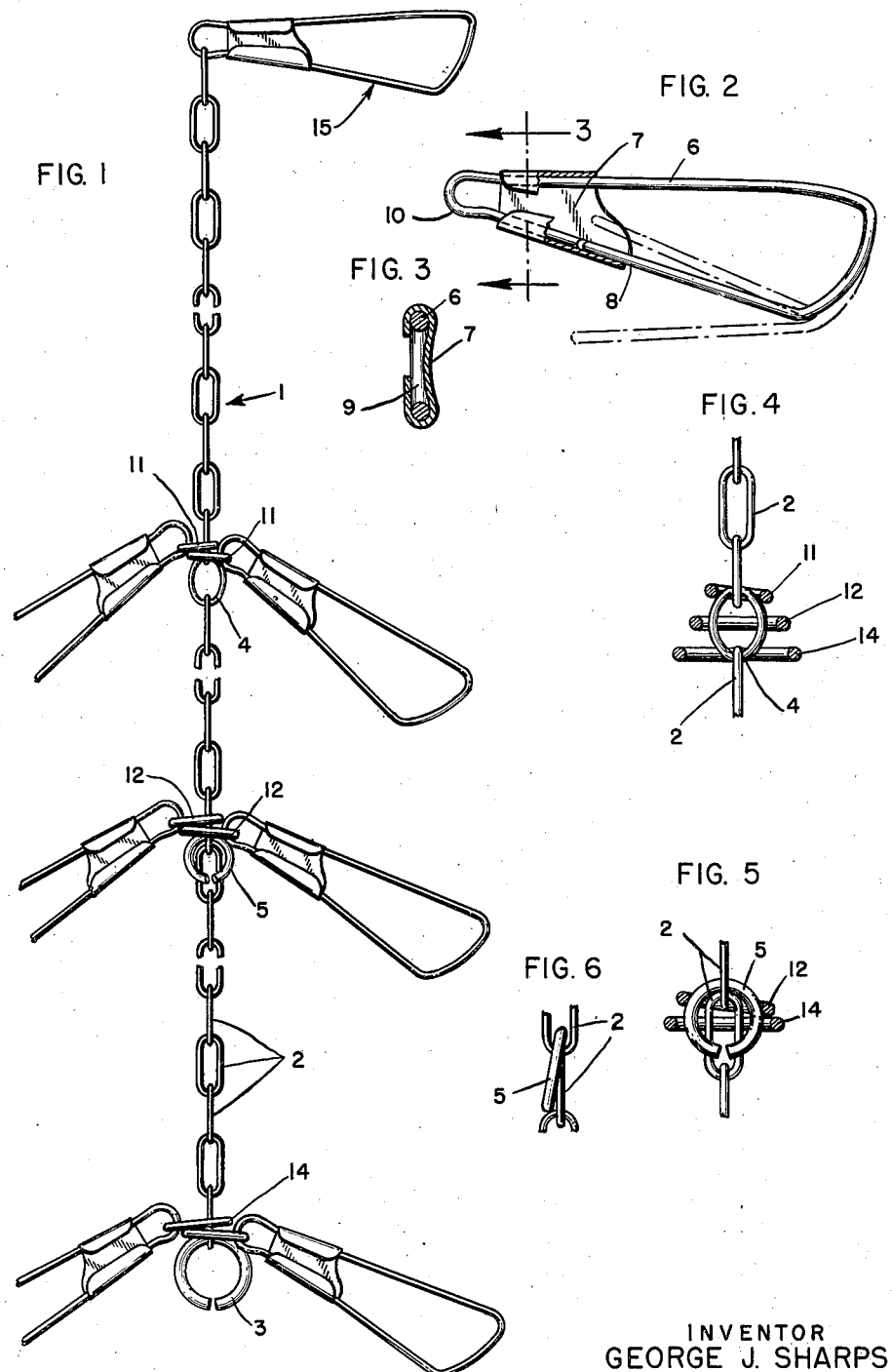
INVENTOR
GEORGE J. SHARPS
BY
ATTORNEYS Patented June 14, 1949

2,473,348

UNITED STATES PATENT OFFICE 2,473,348

FISH STRINGER

George J. Sharps, Chicago, Ill., assignor to Pachner & Koller, Inc., Chicago, Ill., a corporation of Illinois Application February 27, 1947, Serial No. 731,333

4 Claims. (Cl. 224—7.1)

This invention relates to new and useful improvements in fish stringers.

The main objects of this invention are to provide a fish stringer wherein fish may be disposed thereon in separated clusters or individually, in predetermined spaced relation to each other throughout the length of the stringer; to provide a fish stringer of this character wherein the same may be constructed of chain links and safety-pin type fish holders or retainers and wherein the chain is provided with appropriate stops spaced apart thereon in a predetermined relationship to each other; to provide a device of this character wherein the fish holders or retainers are non-separable from the chain but shiftable thereon throughout the length of the chain; and to provide a device of this character which is simple in construction, and inexpensive to manufacture.

An illustrative embodiment of this invention is shown in the accompanying drawings in which:

Figure 1 is an elevational view showing the device of my invention.

Fig. 2 is a front elevational view of the safety-pin type fish hook or retainer, the dotted lines indicating the hook in open position for the reception of a fish; part of the clamp-catch being shown in cross section.

Fig. 3 is a sectional view taken on the line 3—3 of Fig. 2.

Figs. 4 and 5 are schematic views illustrating how certain of the fish retainer rings are prevented from slipping over the stop or spacer rings while the larger rings pass thereover.

Fig. 6 is a side view of the device shown in Fig. 5.

In the drawings I illustrate a fish stringer 1 which is made up of a plurality of oblong-shaped links 2 and having a large stop or terminal ring 3 secured to the lowermost link in the chain.

I provide a distorted or oval-shaped spacer link 4 in place of one of the oblong links 2 in the chain about two-thirds of the distance from the top of the chain and secure a spacer ring 5 to one of the oblong links 2 somewhere intermediate the ring 3 and link 4. The spacer ring 5 is of a diameter slightly smaller than the ring 3 and slightly larger than the spacer link 4.

The fish holder or retainer 6 is of the usual construction and may be purchased on the open market; and takes on the appearance of an enlarged safety-pin. The retainer 6 comprises a bent spring wire shaped to the form shown in Fig. 2 and held in such position by the clamp-catch 7. The free end 8 of the wire is adapted to seat in the U-shaped catch 9 (see Fig. 3). A small loop 10 is also formed when fabricating and bending the wire to which retainer rings are secured.

For the purpose of illustration, I show three pairs of fish retainers 6 spaced on the stringer chain 1. The upper pair of fish retainers 6 is each provided with a ring 11 of a size which will not pass over the distorted, oval-shaped, stop link 4 but position this pair of fish retainers on the chain at this point. (See Fig. 4). It is to be understood that the rings 11 will, however, freely slide on the links 2 between the stop link 4 and the upper end of the stringer.

The middle pair of fish retainers 6 are each provided with a ring 12 of a size larger than the size of rings 11 and which will readily pass over the stop link 4 but will not pass over the stop ring 5. (See Figs. 4 and 5).

The lowermost pair of fish retainers 6 is each provided with a ring 14 of a size which is larger than the size of the rings 12 and which will readily pass over the stop link 4 and stop ring 5 but will not pass over and beyond the terminal ring 3.

It will, therefore, be apparent, especially from Fig. 1, that the stop link 4 and the stop rings 3 and 5 act as bars whereby pairs of retainers 6 are intercepted in their downward movement on the stringer, from the upper end thereof, and thereby spacing the same in predetermined relationship to each other on the stringer.

It will also be apparent that although I have illustrated pairs of fish retainers or holders 6 spaced apart on the stringer, individual fish retainers 6 may be employed as well, depending on the size and weight of the fish strung on the fish stringer.

For the purposes of ilustration, I have found it convenient and advisable to secure a retainer 15 of the same type as the fish holders 6 to the uppermost link in the chain 1 whereby the upper end of the stringer may be passed around the seat of a row boat, or the like, and clamped to itself by the retainer 15

Although but one specific embodiment of this invention is herein shown and described, it will be understood that numerous details of the structure shown may be altered or omitted without departing from the spirit of the invention as defined by the following claims:

I claim:

1. A fish stringer comprising a series of chain links made up into a chain, one of said links in said chain being distorted and positioned in said chain between the opposite ends thereof to form a stop, a terminal stop ring secured to the end link of said chain, an intermediate stop ring secured to said chain substantially medially between said distorted link stop and said terminal stop, a plurality of fish holders having rings slidably mounted on said chain, the ring diameter of a portion of said holders being of a size to readily pass over said link stop and said intermediate stop and be engaged on said terminal stop; the diameter of a portion of said rings being of a size to readily pass over said link stop and be engaged on said intermediate stop; the diameter of the remainder of said rings being of a size which will be engaged on said link stop; all of said holder rings being of a diameter greater than the width of said chain links whereby to freely slide thereon.

2. A fish stringer comprising a series of chain links made up into a chain, an upper stop secured to said chain between the opposite ends of said chain, a terminal stop secured to said chain adjacent the end thereof, an intermediate stop secured to said chain substantially medially between said upper stop and said terminal stop, a plurality of fish holders having rings thereon slidably mounted on said chain the diameter of a portion of said holder rings being of a size to readily pass over said upper stop and said intermediate stop and be engaged on said terminal stop; the diameter of another portion of said rings being of a size to readily pass over said upper stop and be engaged on said intermediate stop; the diameter of the remainder of said rings being of a size which will be engaged on said upper stop only; all of said holder rings being of a diameter greater than the width of said chain links whereby to freely slide thereon.

3. A fish stringer comprising a series of chain links made up into a chain, a terminal stop ring secured adjacent the lowermost chain ling of a diameter substantially larger than the width of said links, an intermediate stop ring of a diameter smaller than the diameter of said terminal ring and larger than the width of said links secured to said chain and spaced away from said terminal ring, a stop link in said chain spaced away from said intermediate stop ring and of a size smaller than said intermediate and terminal stop rings, a series of fish retainers, each having a ring thereon for slidably securing said retainers to said chain, said retainer rings being of different diameters, whereby a portion of said retainers will be engaged by said stop link only, another portion by said intermediate stop ring, and the remainder by said terminal ring, said retainer rings which are engaged by said intermediate and terminal rings being of a diameter to readily pass over said stop link, and said retainer rings which are engaged by said terminal stop ring being of a diameter to readily pass over said intermediate stop ring.

4. A fish stringer, a series of stop rings anchored in spaced relationship to each other along the length of said stringer, said stop rings being successively larger from the top end of said stringer to the lower end thereof, a series of fish-retainer devices each slidably mounted on said stringer by a carrier ring, the diameters of said carrier rings being gradiently larger in diameter whereby selective carrier rings respectively will be engaged in their downward movement on said stringer by selective stop rings.

GEORGE J. SHARPS.

REFERENCES CITED

The following references are of record in the file of this patent:

UNITED STATES PATENTS

| Number | Name | Date |
|---|---|---|
| 2,297,623 | Hickman | Sept. 29, 1942 |